Oct. 24, 1933.   R. AMOROSI   1,931,481
BRAKE EQUALIZER FOR AUTOMOBILES
Filed Jan. 12, 1931
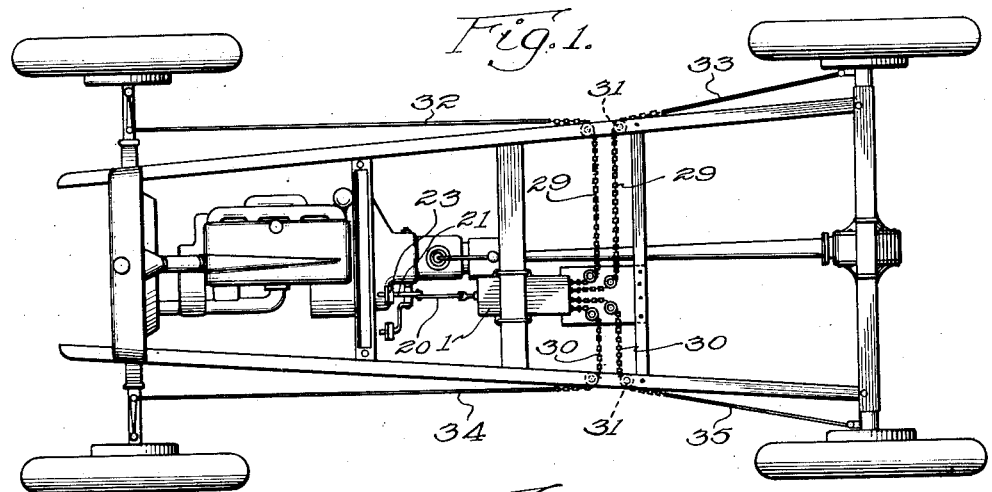
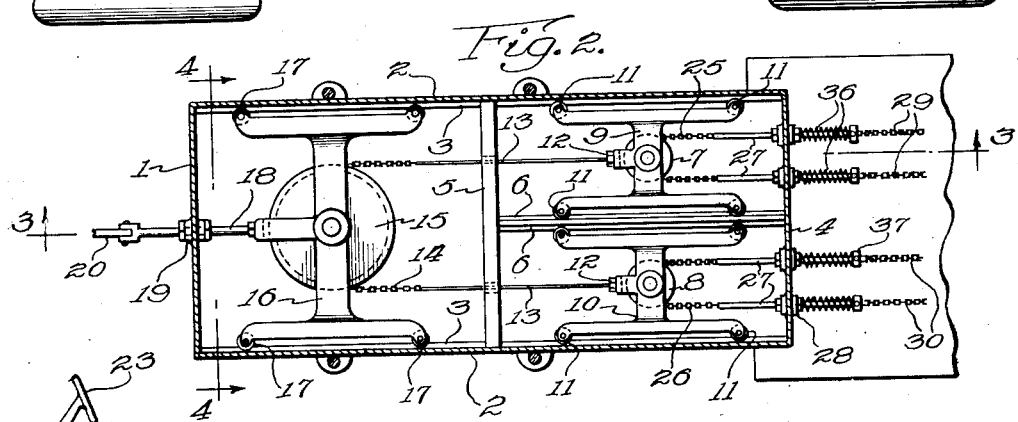
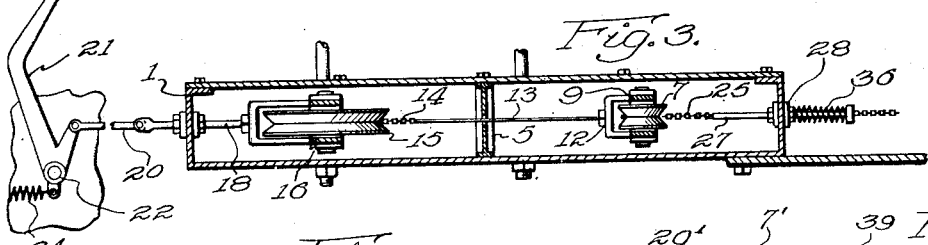
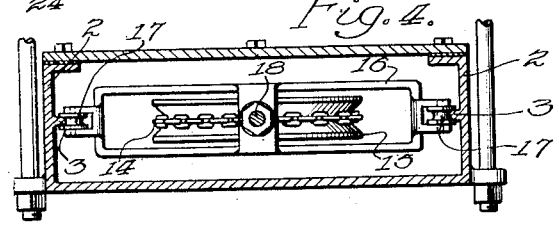
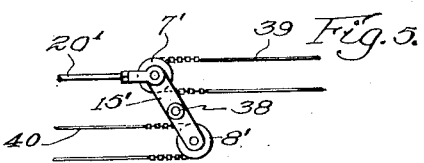
Inventor
Raoul Amorosi.
Witness
Arthur M. Franke.

Patented Oct. 24, 1933

1,931,481

UNITED STATES PATENT OFFICE 1,931,481

BRAKE EQUALIZER FOR AUTOMOBILES

Raoul Amorosi, Chicago, Ill., assignor of one-half to Charles P. Nordberg, Lake Forest, Ill.

Application January 12, 1931. Serial No. 508,305

2 Claims. (Cl. 188—204)

This invention relates to mechanical braking systems for automobiles, and particularly to an equalizing construction for transmitting the power applied to a manually operable brake pedal or lever equally to the different wheel brakes.

The objects of the invention are to provide an improved brake equalizer unit, and a lubricant containing closure for such unit.

The objects of the invention are accomplished by means of a construction as illustrated in the drawing, wherein:

Figure 1 is a plan view of a vehicle chassis provided with the improved brake actuating means.

Fig. 2 is a plan view of the brake equalizer with its casing shown in section.

Fig. 3 is a longitudinal sectional view of the brake equalizer taken on the line 3—3 of Fig. 2, and shows partly broken away the connection to the brake pedal.

Fig. 4 is a transverse section taken on the line 4—4 of Fig. 2.

Fig. 5 is a fragmentary diagram of a modification.

The principal features of construction by means of which the invention is carried out, consists of a housing which may be attached to a vehicle frame, and has slidably mounted therein a set of pulleys, including a pair of pulleys, each of which, by means of a chain passing thereover, is connected to the brakes of a pair of wheels. The supporting frames for the pair of pulleys slide along guides within the housing, and when moved in one direction serve to apply the brakes. Each pulley is free to rotate on its axis; thus, if one brake has a tendency to grip in advance of the other, this condition is corrected by a slight rotation of the pulley.

Connections from these pulley frames are made to a third master pulley by a cable passing thereover from frame to frame of said pair of pulleys. This master pulley is also mounted on a slidable frame, and the latter is linked to the brake pedal. When one pedal is depressed, the frame carrying the master pulley is drawn along its guides, and the master pulley may rotate during such action to permit differential motion between the sliding frames carrying the other pulleys, in case compensation is required to permit all the brakes to act uniformly.

The arrangement above outlined is illustrated in detail in the drawing, Fig. 2 of which shows a housing 1 for the equalizer mechanism, which has on the inside of the side walls 2 thereof, longitudinally extending guide rails 3. The rear wall 4 of the housing with a central frame 5 also supports center rails 6, extending from said frame 5 to the rear wall 4. A pair of pulleys 7 and 8 are carried by frames 9 and 10, each pivotally supporting four grooved rollers 11 which engage the rails 3 and 6. The frames 9 and 10 at a central point 12, are each attached to links 13 passing through apertures in the central partition 5, and the links at their opposite ends are attached to a chain 14 passing around a grooved pulley 15, rotatably mounted in a frame structure 16 carrying a set of four grooved rollers 17 engaging the guide rails 3.

Frame 16 is centrally connected to a rod 18 passing through a bearing 19 in the housing 1. Rod 19 is connected by a link 20 to the brake lever, here illustrated in the form of a bell crank 21, pivotally supported at 22 and having the usual foot pedal 23. The brake lever is depressible against the action of spring 24, and when so depressed, through the link 20 and rod 18, draws the pulley frame 16 forwardly along the guide rails. This motion of frame 16 is transmitted to the pulley frames 9 and 10 through pulley 15 on frame 16 and the chain 14 and rods 13. The forward motion of frames 9 and 10, through their pulleys 7 and 8, is transmitted by chains 25 and 26 to rods 27, which are attached to the ends of these chains and slide in the bearings 28 in the rear wall 4 of the housing. The rear ends of the rods 27 are connected to chains 29 and 30, which pass around pulleys 31, pivotally mounted on the frame structure. The opposite ends of the chains 29—30 are connected to brake actuating rods 32 and 35.

The construction of the brakes is not herein illustrated, as the present improvement relates to compensating means for transmitting motion between the brake pedal to the different brakes. When the brake pedal is released, each brake disengages under the action of its own spring. Compensating means within the housing 1 is restored to its original position by springs 36 compressed between the bearings 28 and stops 37 at the ends of rods 27.

If breakage occurs in one of the brake rods or chains 29 or 30 leading thereto, then when the corresponding stop 37 moves forward as far as possible, further depression of the brake pedal results in the remaining three brakes moving into engagement with the brake drums.

A modification illustrated by Fig. 5 shows a somewhat similar compensating construction arranged to permit the rear brakes to be applied slightly in advance of the front brakes. In this case, the rod 20' corresponds to rod 20, Fig. 3, and connected to the foot pedal, is attached to a lever 15'. This lever has a fixed fulcrum 38 located slightly below the center of the lever, and at its ends carries pulleys 7' and 8'. Chains 39 and 40 passing around these pulleys are respectively connected to the rear and front brake rods. When the brake pedal is depressed, lever 15' rocks to the left tensioning chains 39 and 40, and through these chains causing the brakes to be applied, but the rear brakes which are connected to chain 39 are engaged slightly in advance and harder than the front brakes, due to the greater length of lever 15' above its fulcrum than below its fulcrum.

In operation of the construction illustrated by Figs. 1 to 4 inclusive, a depression of the brake pedal 23 results in drawing the pulley frame 16 forwardly. Through the connection between pulley 15 and the frames 9 and 10, the latter are slid forwardly, according to the respective resistances as determined by the setting of the brakes to which they are attached.

This compensation is provided for by pulley 15. Compensation between each pair of brakes which are connected to pulleys 7 and 8, is provided for by these pulleys rotating as required during their forward motion. Springs 36 which are compressed during the forward motion of the pulleys serve to restore the compensating mechanism when the brake pedal 23 is released.

It will be understood that details of the construction may be altered or omitted without departing from this invention as defined by the following claims.

I claim:

1. In a mechanical brake mechanism for vehicles having four wheel brakes, a manually operable brake lever, a housing for attachment to a vehicle frame, a pair of pulley supports, each slidably mounted within said housing, pulleys rotatably mounted upon said supports, a flexible connection passing over each of said pulleys and having its ends connected with brake actuators, a third pulley support slidably mounted within said housing, a pulley pivoted in said support, a flexible connection passing over said pulley and having its ends connected to said pair of pulley supports, and connection between said manually operable brake lever and said third pulley support.

2. In a mechanical brake mechanism for vehicles having four-wheel brakes, a brake lever, a housing for attachment to a vehicle frame, a pair of pulley supports, each slidably mounted within said housing, pulleys rotatably mounted upon said supports, a flexible connection passing over each of said pulleys and having its ends connected with brake actuators, a third pulley support slidably mounted within said housing, a pulley pivoted in said support, a flexible connection passing over said pulley and having its ends connected to said pair of pulley supports, and connection between said brake lever and said third pulley support.

RAOUL AMOROSI.